(12) United States Patent
Fuller et al.

(10) Patent No.: US 12,167,177 B2
(45) Date of Patent: Dec. 10, 2024

(54) SYSTEM FOR PROJECTING IMAGES INTO A BODY OF WATER

(71) Applicant: WET, Sun Valley, CA (US)

(72) Inventors: Mark W. Fuller, Studio City, CA (US); James W. Doyle, Burbank, CA (US)

(73) Assignee: WET, Sun Valley, CA (US)

( * ) Notice: Subject to any disclaimer, the term of this patent is extended or adjusted under 35 U.S.C. 154(b) by 0 days.

(21) Appl. No.: 17/876,462

(22) Filed: Jul. 28, 2022

(65) Prior Publication Data

US 2023/0114596 A1  Apr. 13, 2023

Related U.S. Application Data

(60) Provisional application No. 63/226,680, filed on Jul. 28, 2021.

(51) Int. Cl.
*H04N 9/31* (2006.01)
*G03B 21/608* (2014.01)

(52) U.S. Cl.
CPC ......... *H04N 9/3141* (2013.01); *G03B 21/608* (2013.01)

(58) Field of Classification Search
CPC ...... G03B 21/28; G03B 21/56; G03B 21/145; G03B 21/608; H04N 9/315; H04N 9/3141; E04H 4/14; E04H 4/148
See application file for complete search history.

(56) References Cited

U.S. PATENT DOCUMENTS

| | | | |
|---|---|---|---|
| 8,550,638 B2* | 10/2013 | Shine | A47F 11/06 348/789 |
| 9,223,192 B1* | 12/2015 | Linnell | G03B 21/608 |
| 9,632,404 B2* | 4/2017 | Grundhofer | G02F 1/0147 |
| 10,187,619 B2 | 1/2019 | Reddy et al. | |
| 10,469,811 B2 | 11/2019 | Reddy et al. | |
| 11,675,262 B2* | 6/2023 | Yokoo | G03B 21/608 353/79 |
| 2013/0063702 A1 | 3/2013 | Nemeth et al. | |
| 2013/0215394 A1* | 8/2013 | Reddy | G03B 21/00 353/31 |
| 2013/0308064 A1* | 11/2013 | LaDuke | H04N 9/3194 348/744 |
| 2014/0085613 A1* | 3/2014 | Doyle | H04N 5/74 353/121 |
| 2017/0075202 A1* | 3/2017 | Wang | G03B 21/60 |
| 2017/0221397 A1 | 8/2017 | Reddy et al. | |
| 2017/0333799 A1 | 11/2017 | Park | |
| 2018/0191990 A1 | 7/2018 | Motoyama et al. | |
| 2019/0316370 A1 | 10/2019 | Drakulich | |
| 2021/0092334 A1* | 3/2021 | Flessas | B25J 19/023 |

OTHER PUBLICATIONS

Panasonic, The Projection Mapping Handbook—Brought to You by Panasonic, a practical guide to successful projection mapping projects, B2Bsales@us.panasonic.com, us.panasonic.com/projectors, Dec. 9, 2020, 11 pages.

(Continued)

*Primary Examiner* — Sultan Chowdhury
(74) *Attorney, Agent, or Firm* — Maceiko IP

(57) ABSTRACT

A system and method for projecting a still shot or video projection into a body of water is described herein.

16 Claims, 13 Drawing Sheets

(56) References Cited

OTHER PUBLICATIONS

Peter Kirkup, A How-To Guide to Projection Mapping, AVTechnology, www.avnetwork.com/features/a-how-to-guide-to-projecting-mappng, Apr. 8, 2019, 3 pages.

Talitha Benner, a 3D Projection Mapping Primer, Blue Pony, blog.bluepony.com/a-3d-projection-mapping-primer, Apr. 11, 2016, 8 pages.

* cited by examiner

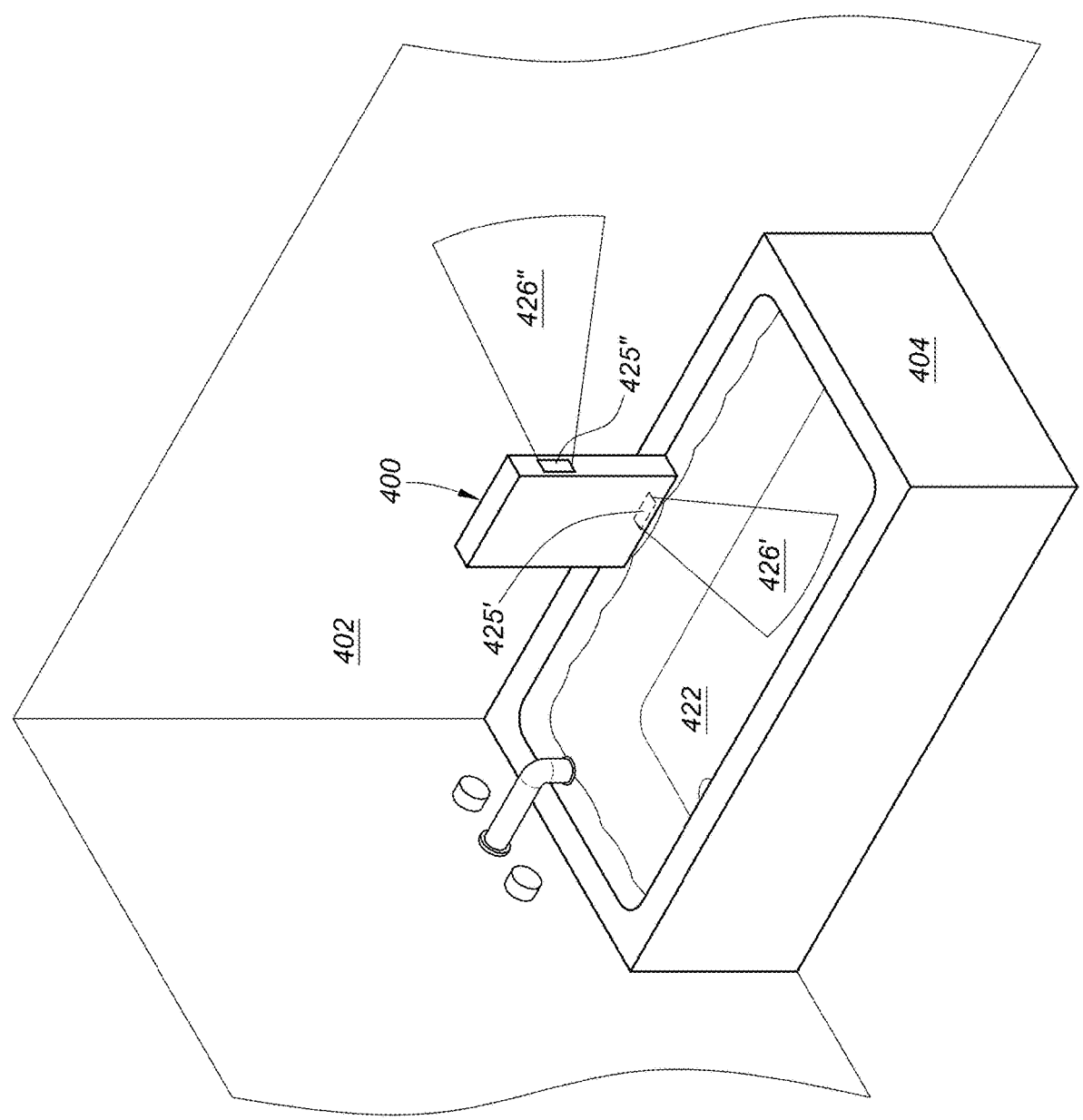

SYSTEM FOR PROJECTING IMAGES INTO A BODY OF WATER

CROSS REFERENCE TO RELATED APPLICATION

This application claims the benefit of U.S. Provisional Application No. 63/226,680, filed Jul. 28, 2021, the contents of which are incorporated herein by reference.

FIELD OF THE INVENTION

The current invention generally relates to displays, including video and still shot image displays that may be projected into a body of water.

BACKGROUND OF THE INVENTION

Various types of lighting effects have existed to illuminate bodies of water such as pools and fountains. However, a need exists for a system to project still shot images and video images into pools and other bodies of water. There is also a need for such a system that may detect objects or persons in the water and that may adjust the projection emitted into the pool based on such detection.

SUMMARY OF THE INVENTION

The current invention addresses the above-noted and other shortcomings by the various inventive aspects described herein. The current invention is described in the Detailed Description of the Preferred Embodiments, as well as in the claims, appearing later. The following Summary of the Invention describes aspects of the current invention.

In an aspect of the invention, a projection system provides still shot or video images into a body of water, e.g., a pool and onto the bottom of the pool. To this end, the system may include a projection system comprising a projector that outputs the still shot or video images, and a device to direct that image to the pool bottom.

In another aspect of the invention, the projector may output a still shot or video image which is redirected by a mirror or other optical devices.

In another aspect of the invention, the video output may be directed to the pool bottom by a device, such as an optical translation device that protect the image to the pool bottom as desired. The device may be raised or lowered so that the window or other feature from which the projection is emitted is above or below the water surface. When above, the projection may be affected by ripples or other surface effects of the water surface, thereby resulting in a distorted image as desired.

In another aspect of the invention, a computer is programmed to integrate real-time information about the surrounding circumstances and integrate them into the still shots or video projection.

In another aspect of the invention, a smaller embodiment is described which may be portable and/or suitable for consumer uses. For example, this embodiment may be suitable for use in smaller bodies of water, e.g., spa, hot tub, bathtub, etc.

Other aspects of the invention are described herein.

BRIEF DESCRIPTION OF THE DRAWINGS

Various other objects, features and attendant advantages of the current invention described herein may be more fully appreciated when considered in conjunction with the accompanying drawings, in which like reference numerals designate the same or similar parts throughout the several views, and wherein:

FIG. 6 shows a smaller-scale image projection system.

DETAILED DESCRIPTION OF THE PREFERRED EMBODIMENTS

The projection or mapping system 10 of the current invention is now described with reference to the figures. Generally, the current invention provides an apparatus and method for projecting a video or still shot image onto the bottom of a body of water, such as a swimming pool, either commercial or residential, as well as in a spa or bathtub. However, system 10 may be used with other types of bodies of water, such as basins that may form part of a water and light display at a hotel or other location. In any event, the scope of the current invention is not limited to the foregoing examples.

It should be noted that while the video or still shot projection may be projected to the bottom of a body of water, the projection itself may appear to be above the bottom. For example, as discussed later in connection with FIGS. 3A-3B, a shark may appear to be swimming in the pool, i.e., in the volume of water above the bottom of the pool. As such, references herein to video or still shots being projected to or onto the pool bottom include video or still shots being projected to have the appearance as if the subject(s) of the projection is/are suspended, moving or otherwise located in the volume of water above the bottom of the pool or other body of water. However, the current invention also includes video or still shots being projected as if they did appear to be on the pool bottom. The current invention also includes video or still shots appearing on either the bottom of the pool or above it over time, e.g., a video of an object bouncing up and down from the pool bottom. The current invention also includes video or still shots appearing on the walls or sides of a pool or other body of water.

Figure 1:
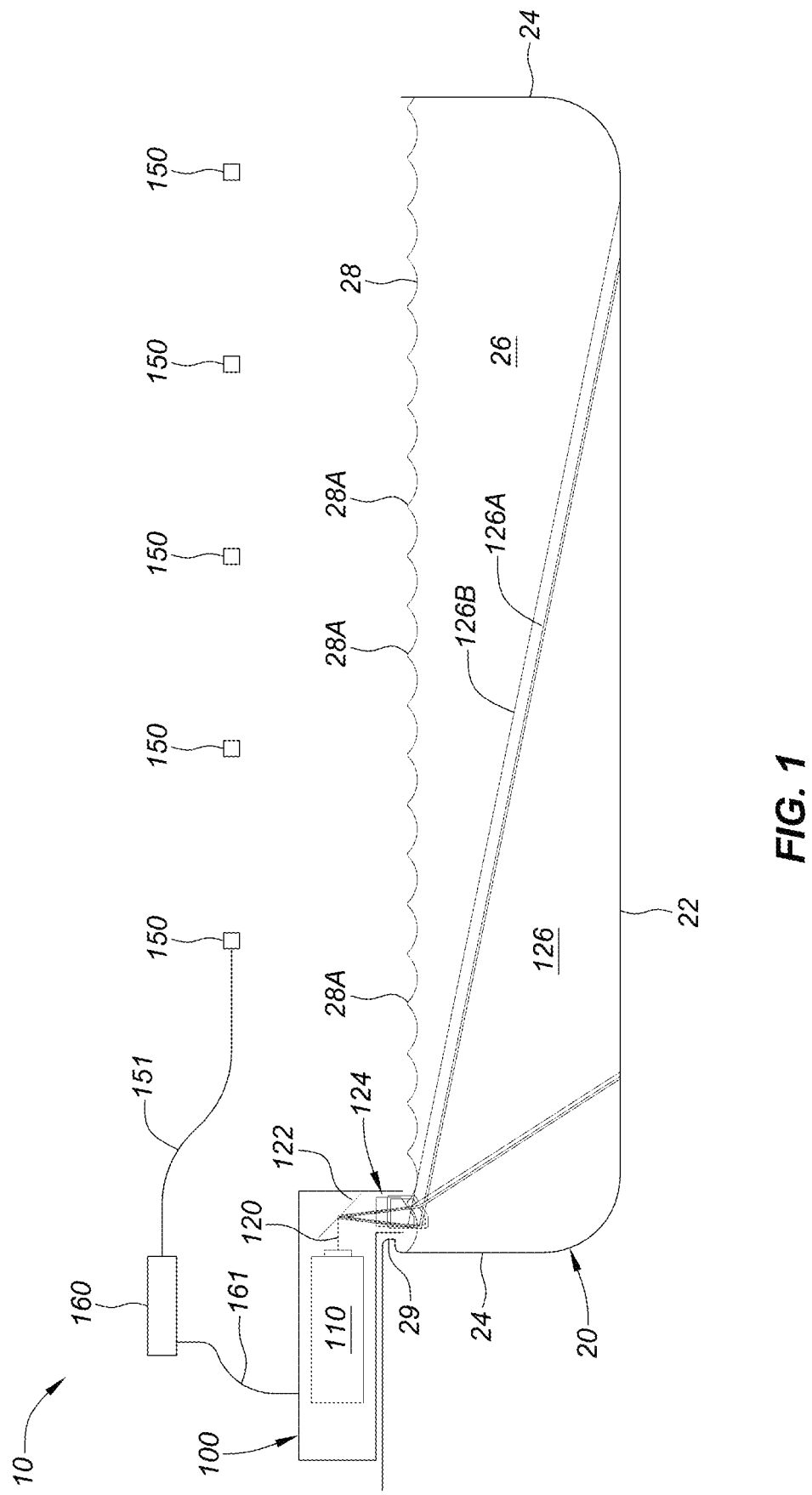
FIG. 1 is a section view of an image projection system for projecting images into a body of water.
Figure 2:
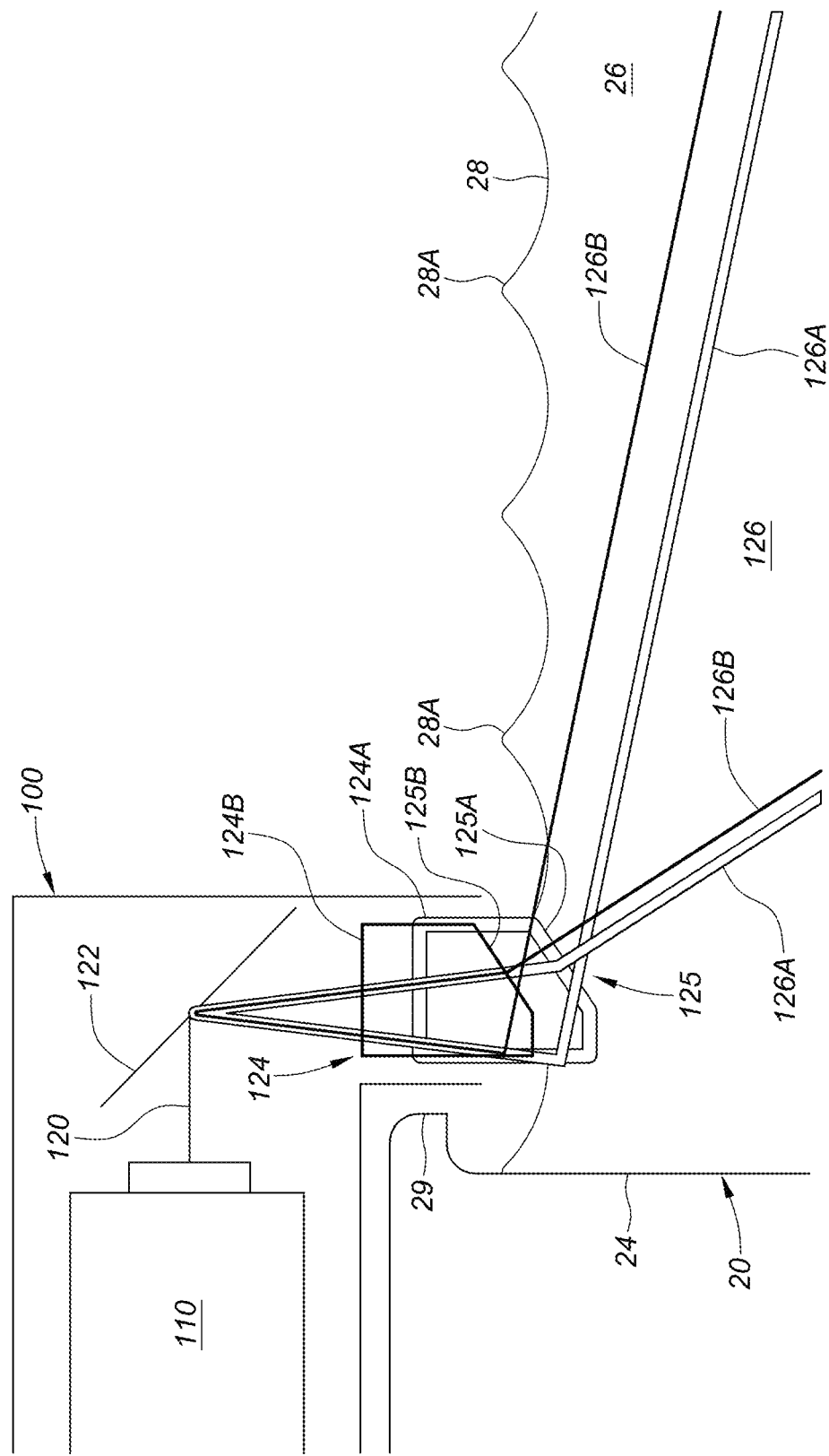
FIG. 2 is an enlarged section view of an image projection system.

An embodiment of projection system or mapping system or visual effect system 10 as used with pool 20 is shown in FIGS. 1-2. As noted above, system 10 may be used with bodies of water other than pools, and FIGS. 1-2 are for example purposes only. In any event, pool 20 may have a surface, such as bottom surface 22, and walls 24, that contain a body or volume of water 26 having a water surface 28. Pool 20 may include edges 29, though other types of edges may be used beyond the type of edge 29 shown in FIGS. 1-2.

System 10 may include projection system 100 that may generally be located at or near an edge 29 of pool 20. System 10 may include multiple projection systems 100 positioned at different locations around pool 20 to enhance and/or coordinate video or still shot projection(s) appearing in pool 20. Projection system(s) 100 may also be located in one or more pool wall(s) 24.

System 100 may include video projector 110 that may project a video or still shot output 120 that may be directed or redirected by, for example, one or more mirror(s) 122. As an alternative, other types of optical trains, e.g., lens(es) and/or prism(s) (not shown), may be used to direct or redirect video or still shot output 120.

In the embodiment shown in FIGS. 1-2, mirror 122 may redirect video or still shot output 120 downward to optical translator 124. However, mirror or some other optical device 122 performing a redirecting function is not necessary and need not be included in other embodiments of projection system 100. That is, the output 120 from projector 110 may be aimed directly at optical translation device 124. The use of a redirecting element 122 may depend, in part, on the packaging of projection system 100 and the dimensions thereof. That is, the use of redirecting elements may allow projection system 100 to be smaller, and thus out of view, e.g., at the edge 29 of pool 20. In any event, the scope of the current invention includes any suitable mechanisms to produce a video or still shot output 120 and direct output 120 to the pool bottom 22.

Upon receiving video or still shot output 120 from projector 110 (either directly or after a redirection by mirror 122 or other optical device), optical translation device 124 may rotate, translate or otherwise position the image to an angle and/or orientation to direct output 120 towards pool bottom 22. For example, where output 120 has been inverted due to mirror 122, optical translation device 124 may itself include a mirror, prism or other suitable optical element to again invert the output so that it is ultimately visible in its intended orientation, e.g., right side up.

After being manipulated by internal optics, e.g., mirror, prism or other suitable optical element, optical translator 124 may direct video or still shot output 120 through window 125 towards pool bottom 22. As output 120 leaves window 125 of optical translation device 124, output 120 becomes the projection 126 that is to be visible in the pool. More specifically, projection 126 is directed through water 26 and onto the bottom surface 22 of pool 20. Window 125 may comprise a clear plastic block or box, glass or other suitable material or other optical element.

The video or still shot projection 126 may be any type of image, and where projection 126 is a video, projection 126 may also be made to appear to move through pool 20. In a preferred embodiment, projection system 100 may be programmed with the suitable images to show. In the case of a video projection 126, projection system may show the video at desired times, from beginning to end, or desired segments thereof. For example, projection 126 may comprise a video of a shark swimming whereby the video shows, e.g., the shark swimming from one end of the field of projection to the other. Projection 126 may also comprise a still shot image, or a series of still shots, that may be shown at desired time and/or sequences.

In another embodiment, projector 110 may itself provide projection 126 to the pool bottom 22. That is, system 10 need not include a separate projector 110 and optical translation device 124. In this embodiment, any positioning of projection 126 into pool 20 or onto bottom surface 22 may be provided by projector 110 itself. Also in this embodiment, any mirror or other redirecting optics 122, if used, may be contained within projector 110. As such, the scope of the current invention is not limited to the embodiments shown in FIGS. 1-2. Indeed, the positioning and/or incorporation of certain components within projection system 110 may vary and still be within the scope of the current invention.

Optical translator 124 may be raised and lowered to provide different types of visual effects. For example, optical translation device 124 may be raised and lowered to place the last interface either in air or underwater, i.e., as the video or still shot projection leaves window 125 and optical translation device 124, its last interface may be with air or water.

When optical translation device 124 is in lower position 124A, window 125 is located at lower position 125A which may be under the water surface 22. In this position, projection 126 leaves translator 124 as projection 126A having a last interface as water. When optical translation device 124 is in upper position 124B, window 125 is located at upper position 125B which may be above the water surface 22. In this position projection 126 leaves translator 124 as projection 126B having a last interface as air.

As shown in FIGS. 1-2, water surface 28 may include ripples 28A or other surface effects reflecting water movement. When optical translation device is in upper position 124B and the last interface is air, projection 126B may encounter such ripples or other surface effects 28A, after leaving window 125. In this manner, projection 1266 may become distorted en route to pool bottom 22, resulting in the image being distorted, thereby providing this type of visual effect. Certain projections or images may be suitable for being distorted.

Alternatively, when the last interface of projection is water, the distortion that may be caused by ripple effects or waves on the water surface 28 may be avoided or reduced. This may be suitable for other types of images and visual effects.

As noted above, another embodiment of the current invention involves a projector 110 which may also acting as the optical translation, or other device that provides projection 126 into pool 20, without the need for any mirror or other redirecting optics 122, and without the need for a separate optical translation device 124. In this embodiment, projector 110 may be positioned above or below water surface 28 so that the appearance of projection 126 may reflect ripple or other surface effects 28A, or not.

As another alternative, system 10, optical translation device 124 and window 125 may be raised and lowered so that projection 126 has a last interface of air or water, i.e., projection 126 is emitted in upper position 126B or lower position 126A. The raising and lowering may occur in successive fashion so that the appearance of projection 126 may be alternatingly affected by surface effects 28A or not. In the alternative embodiment mentioned above, the raising and lowering may simply occur with projector 110 or other device that emits projection 126 above or below surface 28. Whether projector 110 or optical translation device 124, or the emission of projection 126 occurs above or below water surface 28 may be coordinated with the programming of the video or still shot images.

For example, during certain segments of a video projection 126, the contents of the video may be best shown with surface effects 28A, while other segments are best shown by projection 126 being emitted under water. In this situation, the height of projector 110 and/or translation device 124 may be raised or lowered to correspond to video segments or still shots that are preferably projected with or without surface effect 28A.

In another embodiment, system 10 may include one or more video cameras, sensors or other devices 150 that may detect an object or person in the water 26, so that the projected image 126 may respond to the object's or person's being at that location. To this end, video camera(s) 150 may be networked with projection system 100 so that once an object or person is detected in the pool 20, a signal is sent to projection system 10 and projection 126 is altered to react to the presence of the person or object.

Figure 3A:
FIGS. 3A-3B are still shots from a video showing images projected into a pool of a shark swimming.
Figure 3B:
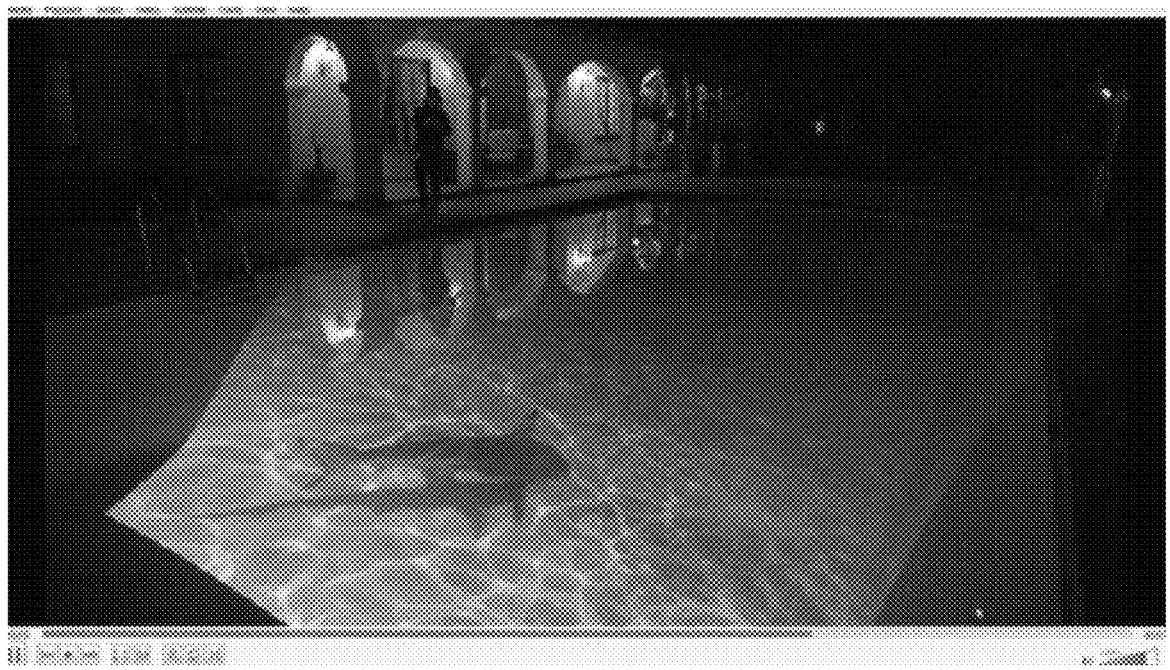
Figure 4A:
FIG. 4A-4L are still shots from a video showing images projected into a pool of electric sparks extending across the pool.
Figure 4B:
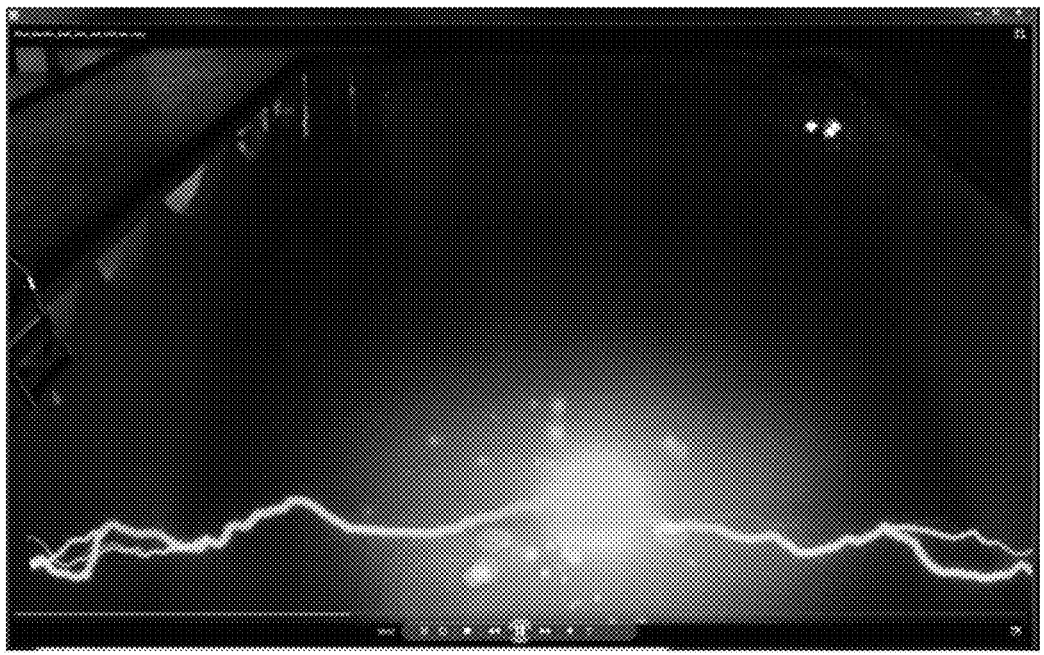
Figure 4C:
Figure 4D:
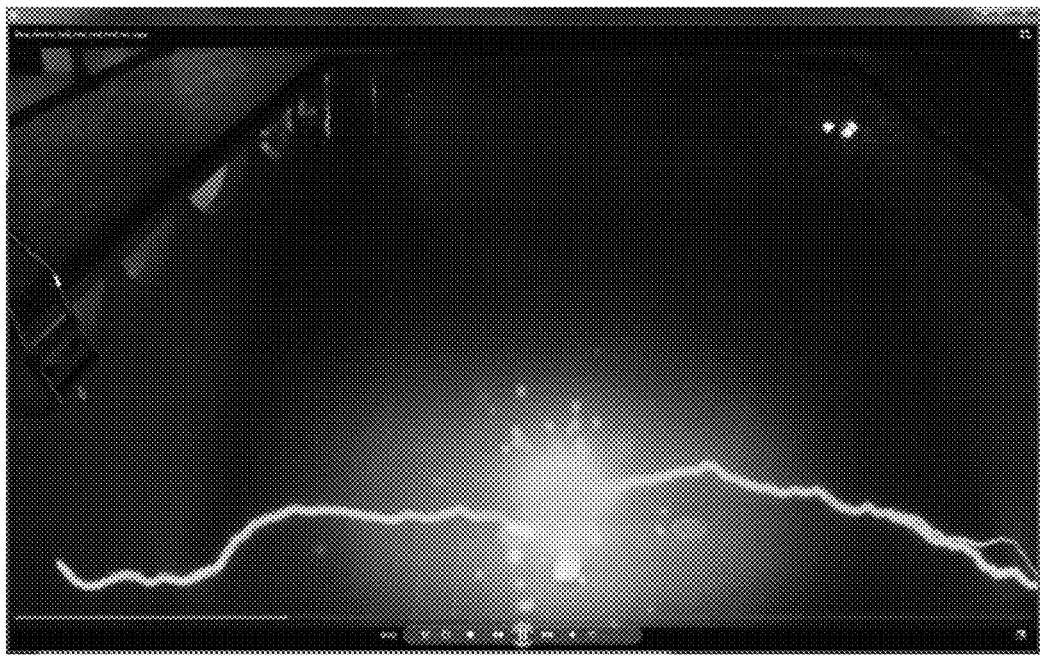
Figure 4E:
Figure 4F:
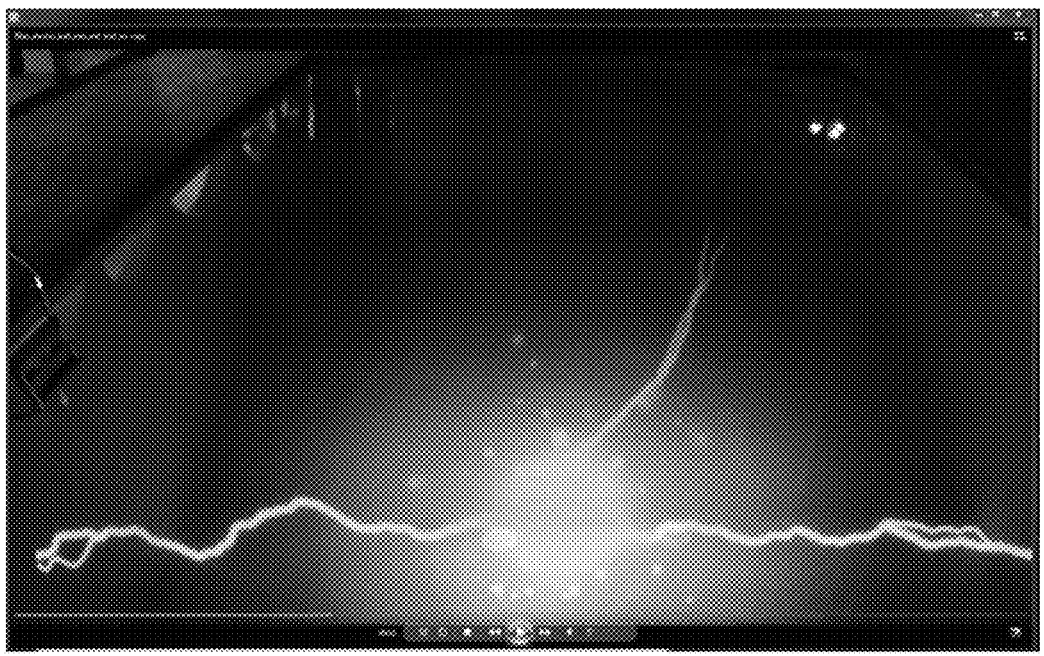
Figure 4G:
Figure 4H:
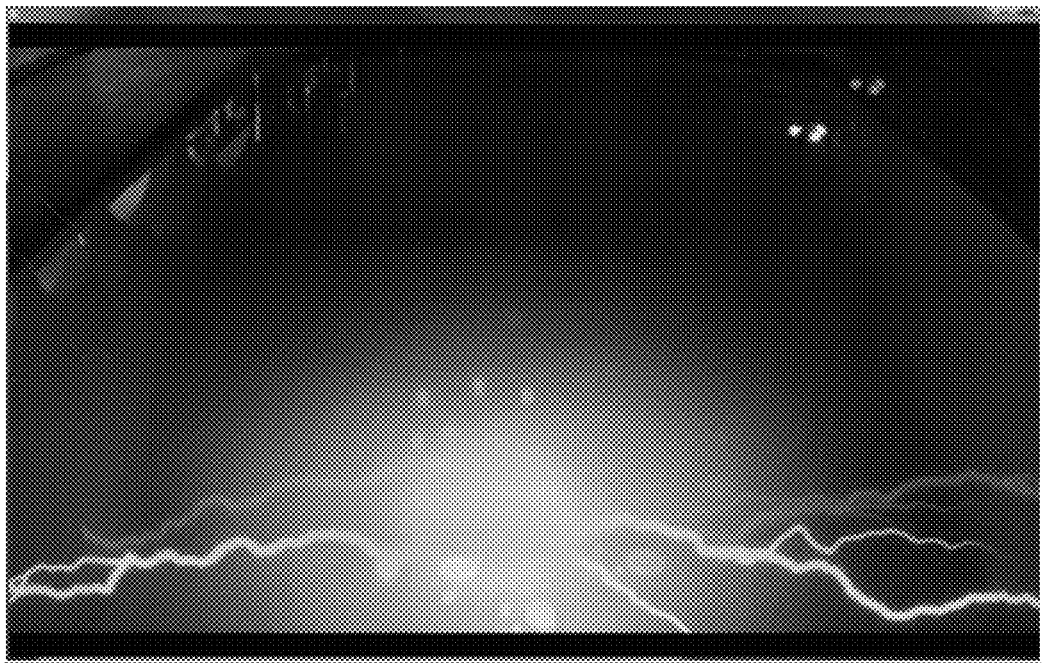
Figure 4I:
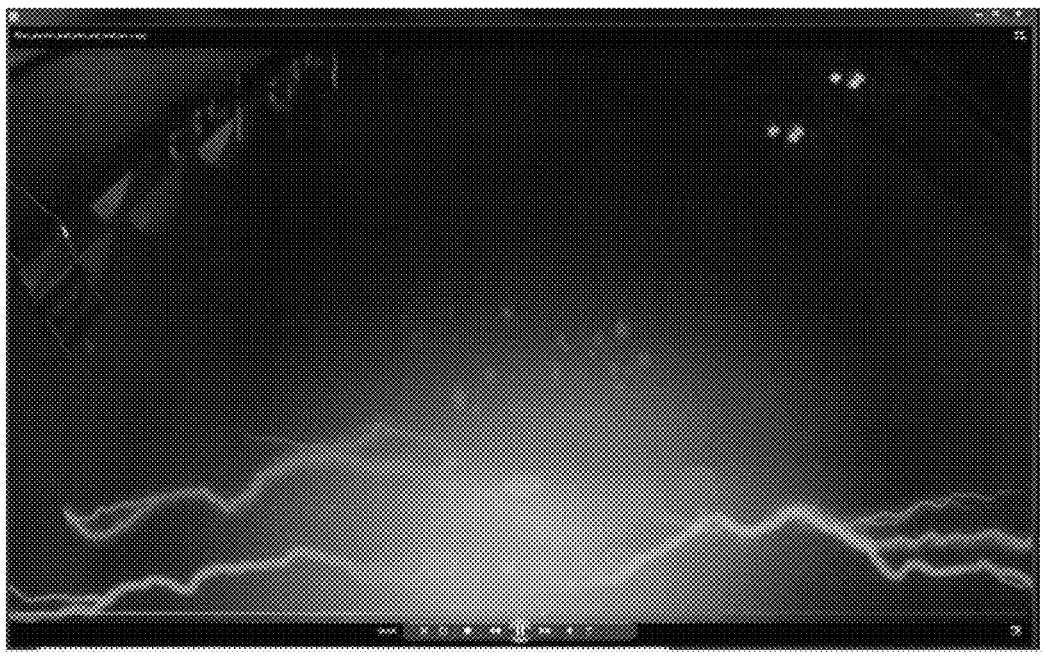
Figure 4J:
Figure 4K:
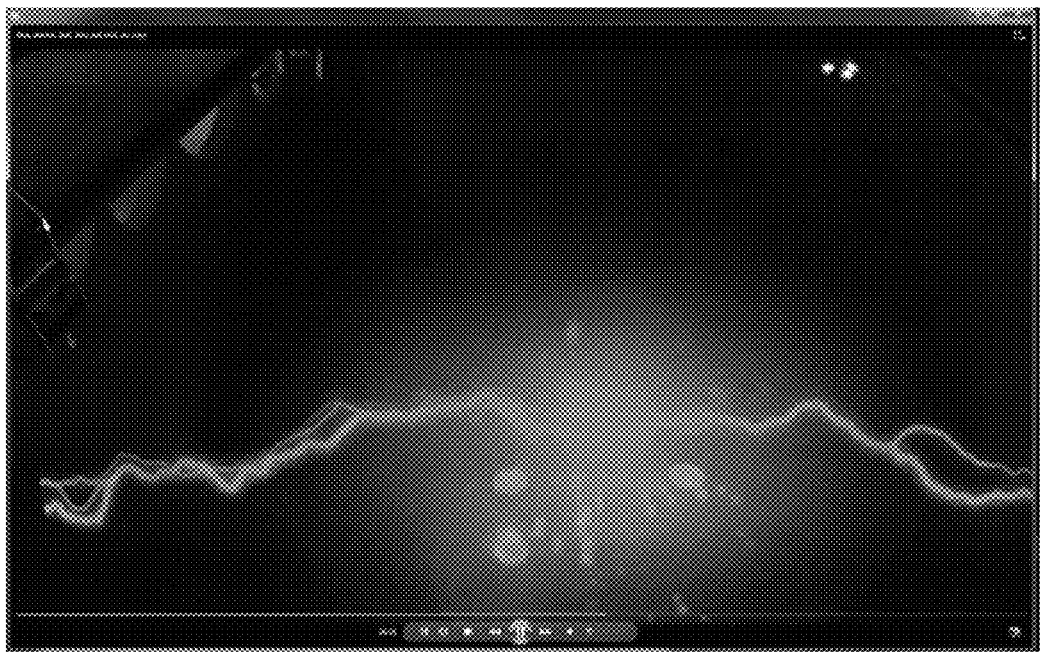
Figure 4L:

For example, projection 126 may comprise a video of a shark wandering aimlessly about the pool bottom such as that shown in FIGS. 3A-3B. Upon detecting the presence of a person or object in the field of projection 126, a signal sent to projection system 100 may alter the video projection 126 so that the shark responds to and follows the person around the field of projection 126. To this end, the video projection 126 may reflect dynamic programming that does not follow a predetermined video sequence, but may instead reflect a video that depends on circumstances in pool 20.

Devices 150 that detect the presence of an object or person in pool 20 may comprise one or more small discrete video camera(s) either placed above pool 20 (or bath or other type of body of water) looking down into the body of water. Alternatively, one or more camera(s) 150 may be included within projector system 100 and may look through the same optical path as projector 110 to image what is in the field of the projection 126. The image from the video projector 110 may be transmitted to a computer that would be capable of using this video image to overlay or modify the outgoing video stream 120 of projector 110.

Another example may involve an abstract projection 126 projected on the pool bottom 22, e.g., a still shot image of an abstract design, that is disturbed by and responds to a swimmer passing over the top of the projection field 126. The response could be anything that may be programmed into projection system 100 and introduced into the video stream output 120, such as a wake of color or stars that follows the swimmer.

The components that may comprise system 10 are now described in more detail. System 10 may include one or more video projectors 110, preferably of sufficient power to provide an image output 120 that ultimately serves to create the desired projection 126 effect over the bottom 22 of the pool 20, bath, reservoir or other body of water.

System 10 also preferably includes one or more device(s), such as optical mirror 122, other optical elements and/or optical translation device 124, relative to or connected to projector 110 which will translate the video image from horizontal to vertical down through the surface of the water and then out over the bottom 22 of the pool 20. It is preferred that the optical device that provides projection 126 may be capable of being raised and lowered, e.g., slightly, so that the effect of ripples or other surface effects 28A on the surface 28 of the pool 20 may or may not be allowed to distort the projected image 126.

A video server 160 may be included in projection system 100 or may be located remote therefrom as shown in FIG. 1. Video (or still shot) server 160 may output the preprogrammed video stream to the projector or projectors through connection 160. Alternatively, server may be integrated into projection system 100 and/or projector 110. As another alternative, any stream of still shots or video may to projector(s) 110 may occur wirelessly.

Still shot or video server 160 may also include a method of live video input so that the video stream output to projector(s) 110 may be modified in real time to respond to an object or a person in the pool 20. Beyond this, however, system 10 may include any programmed effects and computer control to create a multitude of different projections 126, including basic still shots or video, and still shots or video integrated with real time fees and/or other image effects.

As noted above, one or more video camera(s) 150 may be included either within the projector system 100 and/or projector 110, or located remotely somewhere around pool 20. These device(s) 150 may be connected to computer server 160, so that upon receiving a signal indicating that an object or person has been identified, that object or person may be tracked by the computer server 160 and a response to their presence may be included in the video stream 161 fed to project 110. To this end, computer 160 preferably includes software that is able to integrate in real time, information about the person or object and their location, along with the still shots or video that will form projection 126. Alternatively projection system 100 may include server 160 incorporated therein. In any event, when located remotely, the signals provided by devices 150 may be sent to computer server 160 and/or projection system 100 over a hardwire connection 151 or wirelessly.

Several projections 126 that may be provided by system 10 are now further described with reference to FIGS. 3A-3B and 4A-4L. As shown in FIGS. 3A-3B, a video projection of a shark wandering aimlessly around a pool may be displayed. As noted above, this video projection may be altered to react to the presence of an object or person in the pool, e.g., data reflecting the location of the person may be fed to computer 160 which may then integrate that data with the video projection so that the position and/or direction of the shark's travel may be programmed to follow the person. In an embodiment, the field of projection 126 may cover all or some portion of a pool bottom surface 22 so that the shark's movement may travel around all or a significant portion of pool 20.

As shown in FIGS. 4A-4L, a video of an electrical-looking spark may be projected into the pool. Here, the spark may change appearance as would a bolt of lightning, and may also change colors.

The field of projection may cover some portion or all of pool bottom surface 22. As an alternative, multiple projections 126 may cover different portions of pool bottom surface 22. Whether a single or multiple projections 126 are used may apply to all different sorts of content being projected.

As noted, the above-described embodiments may be used with various types of bodies of water, large or small. Another embodiment of the current invention that may be suitable for smaller-scale, consumer applications is now described with reference to FIG. 5 and system 300. This embodiment of the current invention preferably provides the functionality described above in connection with the other embodiments, but may be different in certain aspects. For example, system 10 this invention may be battery powered, which may be suitable if system 300 resides completely underwater. While the above-described embodiments may also be battery-powered, and the computer server may also include a batter power backup, larger embodiments described above may typically be powered by appropriate power sources.

This alternate embodiment 300 may also be specifically designed to provide projections in a certain type of body of water, e.g., in a bathtub, hot tub or small water feature at a residence, e.g., koi pond. While the above-described embodiments may also be designed for certain applications, the above-described embodiments may also provide more flexibility and may serve various applications. The embodiment of system 300 shows that the components described above may provide the projection while being packaged in one enclosure 304. As such, the scope of the current invention with respect to the embodiments of FIGS. 1-2 are not limited to the configuration shown with separate components. But as shown in FIGS. 1-2, the components may indeed be contained in a single enclosure.

System 300 may also be mounted with suction cups 302 or other suitable means to attach to a tile wall 324 of pool 310 or to the wall of a tub or spa, and project imagery 326 through the water and onto the bottom 322 of the tub. System 300 may also include the live feedback version of the above-described embodiments so that, e.g., a child may interact with objects or characters in the projection stream 326, and the projection stream 326 may be altered based on that child interaction. To this end, system 300 may be programmed with games, character interactions, fish or other fun or interesting subject matter for a child to play with.

Another embodiment of the current invention is now described with reference to FIG. 6. As shown, projection system 400 may be mounted to wall 402 and/or bathtub 404. Projection system 400 may operate as described in connection with the various embodiments above.

In the embodiment shown in FIG. 6, projection system 400 may be mounted so that projection 426' may be directed at bathtub bottom surface 422.

Also, projection 426' may be emitted from projection system 400 while window 425' is either in or above the surface of the water in bathtub 404, or below the water surface. This vertical translation may occur as previously described. In this manner, the surface effects described above may be either incorporated into projection 426' or avoided (or reduced).

In the embodiment of FIG. 6, projection system 400 may include another window 425" through which another projection 426" may be emitted onto, e.g., a wall 402 in proximity to bathtub 404. As an alternative, projection 426" or another projection may be directed to the bathtub/shower door (not shown).

In an alternative embodiment, projection system 400 may be mounted higher up on wall 402 so that it does not interfere with a person taking a bath or shower.

Figure 5:
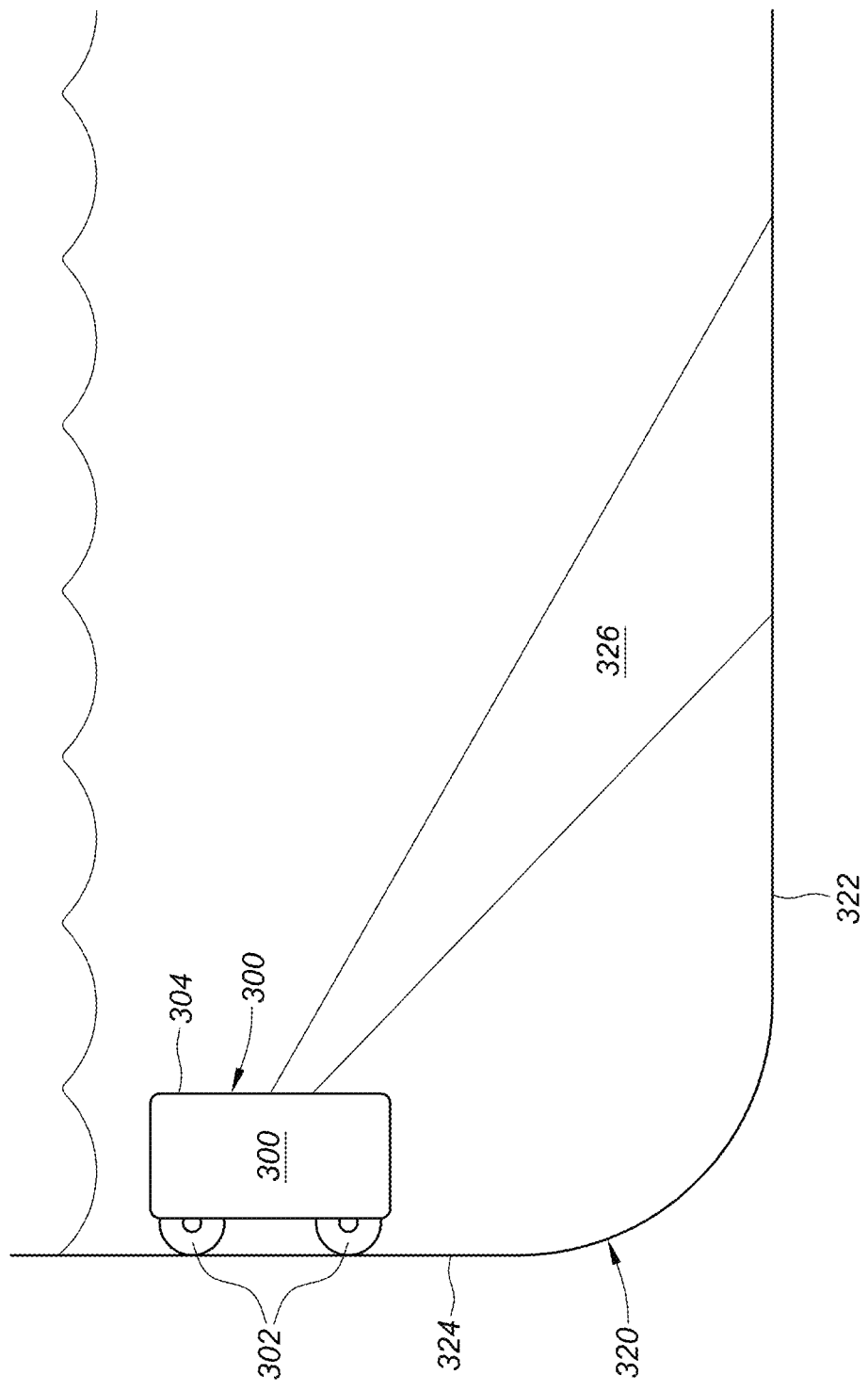
FIG. 5 shows a smaller-scale image projection system.

As with projection system 300 described in connection with FIG. 5, projection system 400 may be programmed with games, character interactions, fish or other fun or interesting subject matter for a child to play with. Alternatively, projection system 400 may direct one or more projections to one or more walls (opaque or glass) of a shower enclosure that may be more suitable for adults.

In another embodiment of the current invention, system 100 (or system 300 or system 400) may include relaxing, meditative or entertaining imagery for adults. In this embodiment, computer 160 may be programmed with such desired content.

In another embodiment, the projection system of the current invention may be configured to provide projections on the interior walls of a bath or shower enclosure. The content of the images to be projected may be personalized to suit the individuals using the bath or shower. The projection system may also provide projections onto the person while in the bath or shower.

The various embodiments described herein may utilize commercially available commercial video projectors. If used, it is preferred that such projectors may be modified to allow addition of external optics in order to provide the desired projections. For example, a commercially available video projector may be fitted with an optical component that provides distortion to the projection as it is emitted from the projector. In this manner, the externally fitted optical component may direct the video image onto the bottom of a pool or bath with distortion to appear properly on the bottom of the pool or tub.

Similar to the embodiment described in connection with FIGS. 1-2 as shown with a pool, the projection system for use with a bath or shower may not include a component for raising or lowering the window, lens or other clear section of the projector from which the projection is emitted to include or avoid surface ripple effects. However, the embodiment for use with a bath may still include this component is appropriately sized.

As noted above, the projection system 100 may be fed data from computer 160 to integrate into the projection 126. In the smaller embodiments of projection system utilizing a commercially available video camera, an additional camera or sensor may be fitted to the outside of the video camera, and then provide data that may be integrated with the projection provided by the video camera. Alternatively, the commercially available video camera may be modified to include an additional camera within its packaging.

The computer server 160 described above preferably includes suitable software and hardware to output the desired preloaded preprogram video content to the projector or projectors. This server may also include the hardware and software necessary to intake the video image from the camera and impose or overlay effects or distortions on the video stream to the projectors in real time. This may be included if the option for interactive video were included.

An advantage of the current invention is that it may avoid the need for expensive software programming, modeling and related efforts that may be associated with different types of projection mapping. Indeed, the current invention may provide dramatic visual effect (that may be choreographed with audio or other sensory effects) as described above.

In the pool version of the current invention shown in FIGS. 1-2, projection system 100 may be packaged or enclosed in a bench or a planter might to conceal the video projector and its associated optical equipment at the edge of the pool. In this manner, the optical train would be extended over the edge looking down into the pool as needed.

In the smaller embodiments suitable for a bath, the projection system may be concealed or incorporated into creative packaging so that it has a character or a creative look. Alternatively, this smaller embodiment may be incorporated into a like a touch control pad or other device as part of its design.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed is:

1. A system for producing an image in a body of water, comprising:
    a projector which provides a video or a still shot image projection; and
    an optical translation device which directs the projection into the body of water which is configured to move up and down, and which moves to position the projection in the body of water in coordination with programming of the video or still shot image.

2. The system of claim 1, wherein the optical translation device is positioned above a surface of the body of water.

3. The system of claim 1, wherein the optical translation device is positioned at least partially below a surface of the body of water.

4. The system of claim 3, wherein the optical translation device includes a window through which the projection is emitted.

5. The system of claim 4, wherein the optical translation device is located at a first position where the window is located above a surface of the body of water, or located at a second position where the window is located below the surface of the body of water.

6. The system of claim 5, wherein the optical translation device is moveable between the first position and the second position.

7. The system of claim 1, wherein the projection comprises a video.

8. The system of claim 1, wherein the projection comprises a still-shot image.

9. The system of claim 1, wherein the optical translation device rotates to position the projection in the body of water in coordination with programming of the video or still shot image.

10. A system for projecting an image into a body of water, comprising:
    a body of water having a surface and a bottom surface;
    a projector that provides a video or a still shot image projection; and
    an optical translation device that directs the projection into the body of water and to the bottom surface, and that includes a window through which the projection is emitted;
    wherein the optical translation device is moveable between a first position where the window is located above the surface so that the projection encounters surface effects of the body of water, and a second position where the window is located below the surface so that the projection avoids surface effects of the body of water; and
    wherein the optical translation device moves in coordination with programming of the video or still shot image.

11. The system of claim 10, wherein the projection is a video of a shark swimming in the body of water.

12. A system for projecting an image into a body of water, comprising:
    a body of water having a surface and a bottom surface;
    a projector that provides a video or still shot projection; and
    an optical translation device that directs the projection into the body of water and to the bottom surface, and that includes a window through which the projection is emitted;
    wherein the optical translation device is moveable between a first position where the window is located above the surface and a second position where the window is located below the surface; and
    wherein the projection is a video of an electric spark in the body of water.

13. A system for projecting an image into a body of water, comprising:
    a body of water having a surface and a bottom surface;
    a projector that provides a video or still shot projection; and
    an optical translation device that directs the projection into the body of water and to the bottom surface, and that includes a window through which the projection is emitted;
    wherein the optical translation device is moveable between a first position where the window is located above the surface and a second position where the window is located below the surface; and
    wherein the projection is an image that is disturbed by and responds to a swimmer passing over the projection.

14. The system of claim 13, further comprising a detector to detect the presence of a person in the body of water.

15. The system of claim 14, wherein the projection is a video and the system receives signals from the detector so that the projection is directed into the body of water depending on where the person is in the body of water.

16. The system of claim 14, wherein the projection is a video of a wake and the system receives signals from the detector detecting the person swimming in the pool such that the wake follows the person.

* * * * *